United States Patent Office 3,421,501
Patented Jan. 14, 1969

3,421,501
METHOD AND APPLICATION OF ORTHOPEDIC APPLIANCES WITH AN ULTRAVIOLET CURABLE PLASTIC IMPREGNATED BANDAGE
Leroy E. Beightol, 7290 W. 90th,
Los Angeles, Calif. 90045
No Drawing. Continuation-in-part of application Ser. No. 472,325, July 15, 1965. This application Sept. 22, 1965, Ser. No. 489,393
U.S. Cl. 128—90  25 Claims
Int. Cl. A61f *13/04;* B01j *1/10*

ABSTRACT OF THE DISCLOSURE

A method for the application of an orthopedic device to a body member which comprises enclosing of the member in a dry ultraviolet curable polymer impregnated flexible bandage, and curing said polymer by exposure to ultraviolet irradiation to form a hard, lightweight physiologically inert integral device.

---

This application is a continuation-in-part of Beightol application Ser. No. 472,325, filed July 15, 1965, and now abandoned.

The present invention pertains to the application of orthopedic devices, and more particularly to the application of orthopedic casts formed of plastic materials without the need for the addition of catalyst to the cast material just prior to application, or polymerization of the cast material by the application of heat.

It has been recognized that the preparation and application of orthopedic casts for the use in the treatment of bone fractures or other conditions requiring immobilization of body members may be advantageously formed from plastic or reinforced plastic materials. The advantages of plastic casts over the more common materials such as plaster of Paris are manifold. In general, the plastic cast is impervious to water, lightweight, characterized by a high strength-to-weight ratio, and substantially transparent to X-rays thus permitting X-ray study of the member after placement in the plastic cast. Previously, however, the use of plastic materials for orthopedic casts has been limited because of the difficulty of applying the plastic material to the body member. The plastic casts are generally formed with a plastic impregnated fabric or cloth which is applied to the body member while the plastic is in a liquid or semi-liquid form.

One method of producing a plastic cast in situ, using cross-linking techniques at room temperatures is through the use of polyester, acrylic, epoxy, or urethane resin systems, which can be catalyzed by the addition and blending of certain catalytic or copolymer agents. The catalyzed resin may then be used to impregnate the reinforcing fabric. However, the reinforced fabric must be applied to the body member within a few minutes since gelling occurs quickly. This procedure while practical in certain cases is not desirable inasmuch as considerable skill and time is required in proportioning and mixing the ingredients, and then in applying the sticky resin to the reinforcing fabric. The application of the wet mass to the body to form the cast is also difficult and inconvenient. Moreover, many of the resin-forming materials when in the liquid state are toxic. Therefore their use is not practical and, in fact, is unacceptable to the medical practitioner.

Another approach in the application of plastic casts involves the use of pre-catalyzation and the development of a so-called B state in resin, where the system is advanced to a condition in which the impregnated fabric has a reasonable shelf life. Upon the application of heat the reaction and polymerization can be made to go to completion. Thus, a fabric impregnated with dry resin which has been advanced to the B state can readily be wrapped in place on the body member. However, the amount of heat and the time required with existing resins systems to complete the hardening process makes the system impractical, especially for sentient patients.

Accordingly, it is a principal object of this invention to provide for the application of orthopedic casts formed of lightweight plastic materials without the need for the use of heat or the requirements for equally undesirable wet lay-up techniques.

A further object of this invention is to provide for the application of orthopedic casts formed of lightweight plastic wherein the hardening or setting of the plastic is accomplished by exposure to ultraviolet irradiation.

These and other objects of the invention will become apparent from the more detailed description which follows.

Briefly, the present invention provides a novel method for the application of an orthopedic cast to a body member which comprises enclosing said member in an ultraviolet curable polymer impregnated, woven or non-woven fabric, and curing said resin by exposure to ultraviolet irradiation to form a hard, lightweight, physiologically inert integral cast.

The resin may be applied to the fabric by a variety of techniques. For example, the fabric may be simply dipped in a polymer solution and thereafter permitted to dry prior to being placed on the body member. Alternatively, the fabric may be dipped in the polymer and immediately thereafter be applied to the body member, or pre-impregnated and stored in suitable packages or containers before being applied to a body member. The fabric itself may be any fibrous material capable of being impregnated by the polymer. In this respect, the term "impregnate" is used to describe a condition in which the polymer is thoroughly intermingled with and in surrounding relation to the threads or fibers of the fabric and does not necessarily indicate that the plastic material is to any extent absorbed by the fibers themselves. Generally, the fabric has a relatively open, knit structure, and the polymer solution will flow into the spaces between the individual fibers of the fabric and become rigidly bonded to the fabric upon hardening of the polymer material by exposure to ultraviolet irradiation. The fabric itself is preferably made of cotton, synthetic fiber, or fiberglass. However, the particular fabric selected will depend upon the particular application, and accordingly this invention is not limited to any particular choice of fabric material.

The present invention is not limited to any specific materials used in making the cast, and thus polymer material may be of any ultraviolet curable material. These materials have the advantage in that no additional chemical catalyst is required, and the initiation of cure does not depend upon elevated temperature. Thus, many polymers previously unsuitable in the preparation of orthopedic devices are used in the practice of this invention. While the use of accelerators and/or catalysts is not required, these materials may be used in certain formulations in order to speed the curing of the resin upon exposure to ultraviolet irradiation. In any event, the ultraviolet curable resins of this invention will quickly form a rigid and/or hard, lightweight material at room temperature, thereby avoiding the need for the application of heat thereto and without producing high, body-irritating temperatures.

The ultraviolet curable resins for use in this invention, by way of example and not of limitation, are those based on the mechanisms of photocatalysts in resinous polymerization such as are obtained by photocatalytic initiation in materials having ethylenic-type unsaturation. In these materials, the initiation is of first order by double bond activation, and any terminal double bonds are progressively activated. In general, the initiation is proportional to the concentration of monomer, and to the square root of light intensity.

An essential part of the preferred impregnating resin is a monomeric ethylenically unsaturated component capable of dissolving minor amounts of a photoinitiator which is active under ultraviolet light.

The use of a monomeric substance such as styrene alone is not practical because of low viscosity, high shrinkage upon polymerization, obnoxious odor, and insufficient strength. For these and other reasons a higher polymeric substance such as a compatible polyester resin is combined to form a solution, which may be a solid or viscous liquid.

Suitable polymers would include almost any of the unsaturated non-catalyzed commercial polyesters of a non-aniline type, and the monomer co-reactant of any compatible terminal ethylenic unsaturated monomer including vinyls, acrylics, allyls, and the like, such as styrene, methyl methacrylate and triallyl cyanurate. The monomer is generally used in an amount of from about 5 to 50% by weight of the polyester, along with about 0.002% to 5% of the photoinitiator.

Suitable photochemical initiators, sometimes also referred to in the art as photo catalysts, for use in the ultraviolet curable resin systems of our invention include, but are not limited to, benzoin, azobisisobutyronitrile, 2,2' dihydroxy-4,4' dimethoxybenzophoenone, 2,4 dihydioxybenzophoenone and similar materials. For example the addition of benzoin in the amounts as low as 0.5% to monomeric styrene will not affect the shelf life appreciably if kept away from light. Upon exposure to moderate intensity ultraviolet light, however, the rate of polymerization is increased by a factor approximately 10 over styrene containing no photoinitiator.

Any light with high enough energy per quantum or of short enough wavelength can initiate polymerization directly. For practical reasons concerned with readily available energy sources, and to provide quick polymerization after the impregnated fabric has been placed on the body member, it is desirable to use a photochemical initiator which acts as an absorber, and releases free radicals from ultraviolet light in the region of 3600 Angstroms. Convenient spectral sources containing bands of 3600 Angstrom light energy are mercury vapor discharge lamps, sunlamps, fluorescent lamps with special phosphors, and sunlight.

Other ultraviolet curable systems suitable for use in the practice of this invention include, for example, the iodoform-sensitized hardenable colloids disclosed in U.S. Patent No. 1,587,274; and the metal carbonyl-sensitized aliphatic diene-unsaturated long chain oil systems described in U.S. Patent 1,891,203. The disclosures of these patents are incorporated herein by reference. The materials containing iodoform or other bactericides have the additional advantage of providing an antiseptic material on the impregnated fabric. Many other ultraviolet curable polymers systems are known and are suitable for use in our invention.

The examples presented herein serve solely to illustrate the invention. Accordingly, the examples should not be regarded as limiting the invention in any way. In the examples, the parts and percentages are by weight unless otherwise indicated.

The fabric material which is impregnated with the ultraviolet irradiation curable polymer system may be in the form of a continuous sheet, or of short or long strips. For example, the impregnated fiber may be about 2 inches wide and after impregnation rolled up until it is desired to use the same in wrapping a body member. In applying the rolled up material to the body member, the strip is wrapped around the member in an advancing overlapping manner, advancing about one inch per turn. When the member has been completely wrapped in the impregnated fabric, the member is then exposed for a short time on the order of from five minutes to one-half hour to ultraviolet irradiation.

Alternatively, prior to the wrapping of the member with the impregnated fiber, the member may be first covered with a stockinette and/or a plastic wrap such as polyethylene. Thereafter, when the polymer has been cured, the stockinette may be left in place or, more preferably, slipped out from inside the cast to leave a cast free of material tending to permanently entrap moisture against the skin to cause skin infection and/or irritation. The removal of the stockinette is facilitated by the presence of an interlayer wrapping of plastic to prevent adhesion of the cast to the stockinette.

Example 1.—Resin A

A typical general purpose rigid polyester was made as follows:

An alkyd kettle equipped with heating means, turbine type agitation, gas sparger inlet, reflux condenser and temperature controls was charged with

| | Parts |
|---|---|
| Phthalic anhydride | 35.07 |
| Propylene glycol | 41.71 | and heated at 450° F. until an acid number of 15 was reached. Maleic anhydride 23.22 parts was then added in small increments, and by cooling a temperature was maintained at 400° F. in the kettle, and held for 4 hours. The temperature was then dropped to 200° F.

| | Parts |
|---|---|
| Styrene monomer | 45.74 |
| Para tertiary butyl catechol | 0.13 | were mixed and added to the contents of the kettle with good agitation.

Benzoin—1.0 part was then added and dissolved. The contents of the kettle were then cooled and discharged to a metal container.

Example 2.—Resin B

A flexible type of polyester was made in a similar manner to Example 1 comprising the following:

| | Parts |
|---|---|
| Phthalic anhydride | 23.65 |
| Adipic acid | 5.81 |
| Maleic anhydride | 19.64 |
| Diethylene glycol | 50.90 |

After the reaction was completed and cooled

| | Parts |
|---|---|
| Triallyl cyanurate monomer | 46.50 |
| Hydroquinone | 0.04 | was mixed and blended to the charge.

Azobisisobutyronitrile—0.5 part was then added and the kettle contents discharged to a metal storage container.

Example 3

A commercial polyester Laminac #4123 (American Cyanamide) was combined with 1% by weight of UV50 Sunlight catalyst made by U.S. Peroxygen and stored in a dark container.

Example 4

Plaskon #942 (Allied Chemical Co.) a commercial polyester was combined with 2,4-dihydioxybenzophoenone 0.5% and stored in a metal container.

Example 5

A commercial polyester Polylite #31000 (Reichhold Chemical) was blended with 0.5% benzoin dissolved in styrene monomer and stored in a closed container away from light.

Example 6

A quantity of Resin A as prepared in Example #1 was poured into an open faced, dumbell shaped, tensile strength, test casting mold, to a depth of 0.125″. The light from a mercury arc lamp #AH[4] made by General Electric was allowed to fall on the fluid contents of the mold from a distance of 12″. It was observed that within 30 minutes the contents of the mold had solidified due to the ultraviolet radiation from the lamp. A similar test without the mercury light, did not cause polymerization even after 24 hours.

Test data on the tensile specimens so cast showed

| | | |
|---|---|---|
| Tensile strength | p.s.i | 6,500 |
| Flexural strength | p.s.i | 16,000 |
| Percent elongation | | 1.5 |

Example 7

A 50/50 blend was made of Resin A Example #1 and Resin B Example #2 and cured by the light of a mercury arc lamp in tensile specimen molds. The following data was obtained from the castings:

| | | |
|---|---|---|
| Tensile strength | p.s.i | 4,100 |
| Flexural strength | p.s.i | 8,000 |
| Percent elongation | | 6.8 |

Example 8

A strip of 5.73 ounce fiberglass cloth with a construction 57 x 30 0.0055″ thick was saturated with Resin A and passed through rolls until excess resin was removed. The resin pickup was 40% by weight. The impregnated cloth was wrapped around a collapsible mandrel and exposed to the light of a 250 watt General Electric UA-2 ultraviolet lamp from a distance of 12″. After twenty minutes the lamp was removed and the resin impregnated glass examined. It was found to be a rigid self-supporting structure, and without noticeable heat content. No tackiness was apparent and upon removal of the mandrel the tube was capable of supporting considerable weight in spite of the light weight.

Example 9

A 4 ounce woven fiberglass tape 2″ wide was impregnated with a solution of the resin of Example #3 in acetone. The ribbon was passed through rolls and through a hot air bath to remove the solvent. By measurement the resin concentration in the cloth was 34%. The slightly tacky tape was then rolled around a cylindrical core with polyethylene tape interposed between each layer as a separation. The wound core was then placed in an impervious plastic bag and stored at 30° F. for two months. The tape was then allowed to come to room temperature and wound spirally on a flexible mandrel.

Exposure to ultraviolet light from a sunlamp at a distance of 8″ produced a rigid structure which was conformed to the flexible shape. Examination showed the plastic shape to be rigid, tack free, lightweight, and very strong.

Example 10

A roll of 1½″ wide 0.005″ pliable nylon bias tape was unrolled and continuously passed through a tank and around submerged rollers. The tank was filled with a 85% solution of the resin system in Example #4 in dimethyl ketone. Above the tank were squeeze rollers and excess resin was removed from the tape as it passed through. A vertical tower with circulating hot air was used to dry the tape before rewind upon cores with an interleaved strip of silicone treated paper separating each layer.

The wound cores were then placed in polyethylene bags in which the air had been displaced by dry nitrogen before sealing. The bags were then placed in sealed opaque containers and half were stored under refrigeration at 35° F. and the others at 70° F. At intervals of a few weeks a container was opened and a strip of the unrolled tape exposed to ultraviolet radiation as a test for package stability of the system. It was found that room temperature storage gave good results for periods in excess of three months, and in refrigerated storage for periods of at least nine months.

Example 11

Several bias weave cotton bandages were impregnated with the resin system of Example #5 in a similar manner to the techniques of Example #10.

An orthopedic test subject was chosen, and the forearm prepared by placing a stockinette sheath around the arm. Over this was placed and taped in place a cushion of ½″ thick soft flexible urethane foam. A wrapping of 0.002″ polyethylene sheet was then provided over the foam. The pre-impregnated cotton bandages were then wrapped over the covered areas of the arm to form a sheath with an average thickness of 0.100″. A medical type ultraviolet lamp was then used to irradiate the bandage surfaces from a distance of 12″. Within 30 minutes the surface was hard, rigid and very light in weight. No discomfort was reported by the test subject either from heat or fumes. A radiograph taken through the case showed no impediment to X-rays due to the cast, and showed that X-ray examination was practical with the cast in place.

The technique of this invention provides an orthopedic device to which may be attached, for example, bolts, clamps, or any other anchor or holding attachment, threaded or unthreaded. These attachments may be used for pulling, lifting or suspending, as in traction or for therapy purposes. The devices of our invention are applicable not only to members of the human body, but also to animal members.

The casts can be removed by any of the conventional means used for removal of plaster casts, i.e., a vibratory saw.

Having fully described the invention, it is intended that it be limited only by the lawful scope of the appended claims.

I claim:
1. A novel method for the application of an orthopedic device to a body member which comprises enclosing said member in an essentially dry ultraviolet curable polymer impregnated, flexible fabric; and curing said polymer by exposure to ultraviolet irradiation to form a hard, lighweight, physiologically inert integral device.

2. A method for the application of an orthopedic device to a body member which comprises enclosing said member in an essentially dry ultraviolet curable polymer impregnated, flexible fabric; and curing said polymer at room temperature by exposure to ultraviolet irradiation to form a hard, lightweight, physiologically inert integral device.

3. A novel method for the application of an orthopedic cast to a body member which comprises enclosing said member in an essentially dry ultraviolet durable polyester polymer impregnated, flexible fabric; and curing said polyester polymer at room temperature by exposure to ultraviolet irradiation to form a hard, lightweight, physiologically inert integral cast.

4. A novel method for the application of an orthopedic cast to a body member which comprises wrapping said member in a long strip of an essentially dry ultraviolet curable polymer impregnated, flexible fabric; and curing said polymer at room temperature by exposure to ultraviolet irradiation to form a hard, light-weight, physiologically inert integral cast.

5. A novel method for the application of an orthopedic cast to a body member which comprises wrapping said member in a long strip of an essentially dry ultraviolet curable polymer impregnated, flexible cotton fabric; and curing said polymer at room temperature by exposure to ultraviolet irradiation to form a hard, lightweight, physiologically inert integral cast.

6. A novel method for the application of an orthopedic cast to a body member which comprises wrapping said member in a long strip of an essentially dry ultraviolet curable polyester polymer impregnated, flexible cotton fabric; and curing said polyester polymer at room temperature by exposure to ultraviolet irradiation to form a hard, lightweight, physiologically inert integral cast.

7. A novel method for the application of an orthopedic device to a body member which comprises enclosing said member in an essentially dry ultraviolet curable polymer impregnated, flexible fabric; and curing said polymer by exposure to sunlight to form a hard, lightweight, physiologically inert device.

8. A novel method for the application of an orthopedic device to a body member which comprises enclosing said member in an essentially dry ultraviolet curable polymer impregnated, flexible fabric; and curing said polymer by exposure to an ultraviolet lamp to form a hard, lightweight, physiologically inert device.

9. A novel method for the application of an orthopedic device to a body member which comprises enclosing said member in an essentially dry ultraviolet curable polymer impregnated, flexible fabric; and curing said polymer at room temperature by exposure to an ultraviolet lamp to form a hard, lightweight, physiologically inert device.

10. A novel method for the application of an orthopedic device to a body member which comprises enclosing said member in an essentially dry ultraviolet curable polyester polymer impregnated, flexible fabric; and curing said polymer at room temperature by exposure to an ultraviolet lamp to form a hard, lightweight, physiologically inert device.

11. The method of claim 1 wherein the exposure to ultraviolet irradiation has a duration of from about five minutes to one-half hour.

12. The method of claim 4 wherein said body member is covered with a stockinette prior to being wrapped in said strip.

13. The method of claim 12 wherein said stockinette is removed from the inside of the cast after curing.

14. A method for the application of an orthopedic cast to a long body member which comprises wrapping said member in a long strip of a resin impregnated fabric, said resin comprising a polymeric unsaturated polyester containing a monomer containing terminal ethylenic unsaturation, and a photoinitiator responsive to ultraviolet light, and curing said resin by exposure to ultraviolet irradiation to form a hard, lightweight, physiologically inert integral cast.

15. A novel method for the application of an orthopedic cast to a body member which comprises wrapping said member in a long strip of resin impregnated fabric, said resin comprising a polymeric unsaturated polyester resin containing between 5% and 50% by weight of monomer containing terminal ethylenic unsaturation, and between 0.002% and 5% by weight of an ultraviolet responsive photoinitiator, and curing said resin at room temperature by exposure to ultraviolet radiation to form a hard, lightweight, physiologically inert integral cast.

16. A novel method for the application of an orthopedic cast to a body member which comprises wrapping said member in a long strip of resin impregnated fabric, said resin comprising a polymeric unsaturated polyester resin containing between 5% and 50% by weight of styrene, and between 0.002% and 5% by weight of an ultraviolet responsive photoinitiator, and curing said resin at room temperature by exposure to ultraviolet radiation to form a hard, lightweight, physiologically inert integral cast.

17. A novel method for the application of an orthopedic cast to a body member which comprises wrapping said member in a long strip of resin impregnated fabric, said resin comprising a polymeric unsaturated polyester resin containing between 5% and 50% by weight of an ethylenically unsaturated allyl monomer, and between 0.002% and 5% by weight of an ultraviolet responsive photoinitiator, and curing said resin at room temperature by exposure to ultraviolet radiation to form a hard, lightweight, physiologically inert integral cast.

18. A novel method for the application of an orthopedic cast to a body member which comprises wrapping said member in a long strip of resin impregnated fabric, said resin comprising a polymeric unsaturated polyester resin containing between 5% and 50% by weight of a monomeric methacrylate, and between 0.002% and 5% by weight of an ultraviolet responsive photoinitiator, and curing said resin at room temperature by exposure to ultraviolet radiation to form a hard, lightweight, physiologically inert integral cast.

19. A novel method for the application of an orthopedic cast to a body member which comprises wrapping said member in a long strip of resin impregnated fabric, said resin comprising a polymeric unsaturated polyester resin containing between 5% and 50% by weight of a monomer containing terminal ethylenic unsaturation, and between 0.002% and 5% by weight benzoin, and curing said resin at room temperature by exposure to ultraviolet radiation to form a hard, lightweight, physiologically inert integral cast.

20. A novel method for the application of an orthopedic cast to a body member which comprises wrapping said member in a long strip of resin impregnated fabric, said resin comprising a polymeric unsaturated polyester resin containing between 5% and 50% by weight of monomer containing terminal ethylenic unsaturation, and between 0.002% and 5% by weight of a hydroxy benzophenone, and curing said resin at room temperature by exposure to ultraviolet radiation to form a hard, lightweight, physiologically inert integral cast.

21. A novel method for the application of an orthopedic cast to a body member which comprises wrapping said member in a long strip of resin impregnated fabric, said resin comprising a polymeric unsaturated polyester resin containing between 5% and 50% by weight of a monomer containing terminal ethylenic unsaturation, and between 0.002% and 5% by weight of an azo-nitrile, and curing said resin at room temperature by exposure to ultraviolet radiation to form a hard, lightweight, physiologically inert integral cast.

22. A novel method for the application of an orthopedic cast to a body member which comprises wrapping said member in a long strip of a resin impregnated fabric, said resin comprising a methacrylate polymer dissolved in monomeric methacrylate and containing a photoinitiator, and curing said resin at room temperature by exposure to ultraviolet radiation, to form a hard, lightweight, physiologically inert integral cast.

23. A novel method for the application of an orthopedic cast to a body member which comprises wrapping said member in a long strip of resin impregnated fabric, said resin comprising a polymeric unsaturated polyester resin containing 30% by weight monomeric styrene and 1% by weight benzoin, and curing said resin at room temperature by exposure to ultraviolet radiation to form a hard, lightweight, physiologically inert integral cast.

24. An essentially dry storage stable flexible resin impregnated fabric adapted to wrap a body member, said fabric being in the form of a long narrow bandage strip, said resin comprising an ultraviolet curable polymer capable of becoming hard and rigid at room temperature upon exposure to ultraviolet radiation.

25. An essentially dry storage stable flexible resin impregnated fabric adapted to wrap a body member, said fabric being in the form of a long narrow bandage strip, said resin comprising an ultraviolet curable polymer comprising an unsaturated polyester, an unsaturated monomer containing terminal unsaturation, and a photoinitiator responsive to ultraviolet light, said polymer being capable of becoming hard and rigid at room temperature upon exposure to ultraviolet radiation.

References Cited

UNITED STATES PATENTS

| | | | |
|---|---|---|---|
| 2,413,973 | 1/1947 | Howk | 117—62 XR |
| 2,450,503 | 10/1948 | Drummond | 117—93.31 |
| 2,935,065 | 5/1960 | Homier et al. | 128—91 |
| 3,027,336 | 3/1962 | Gotz et al. | 128—90 XR |
| 3,089,486 | 5/1963 | Pike | 128—90 |
| 3,326,710 | 6/1967 | Brodie | 117—93.31 XR |

RICHARD A. GAUDET, *Primary Examiner.*
RONALD L. FRINKS, *Assistant Examiner.*

U.S. Cl. X.R.

264—22; 204—159.15, 159.19; 117—62, 93.31